US 6,725,167 B2

(12) United States Patent
Grumstrup et al.

(10) Patent No.: US 6,725,167 B2
(45) Date of Patent: Apr. 20, 2004

(54) FLOW MEASUREMENT MODULE AND METHOD

(75) Inventors: Bruce Frederick Grumstrup, Marshalltown, IA (US); Paul Robert Adams, Marshalltown, IA (US)

(73) Assignee: Fisher Controls International LLC, St. Louis, MI (US)

( * ) Notice: Subject to any disclaimer, the term of this patent is extended or adjusted under 35 U.S.C. 154(b) by 0 days.

(21) Appl. No.: 10/050,450

(22) Filed: Jan. 16, 2002

(65) Prior Publication Data
US 2003/0135335 A1 Jul. 17, 2003

(51) Int. Cl.$^7$ .............................. G01F 1/00; G05D 11/13
(52) U.S. Cl. ..................... 702/47; 73/118.1; 60/39.281; 137/487.5; 700/282
(58) Field of Search ............................. 702/45, 47, 50, 702/52, 53; 73/118.1, 152.24, 168, 199, 1; 137/8, 487.5; 700/282

(56) References Cited

U.S. PATENT DOCUMENTS

| | | | |
|---|---|---|---|
| 3,633,416 A | 1/1972 | Van Dyke et al. ............. 73/199 |
| 3,846,774 A | 11/1974 | Thorbard et al. ............ 340/611 |
| 4,277,832 A | 7/1981 | Wong | |
| 4,406,161 A | 9/1983 | Locke et al. | |
| 4,581,707 A | 4/1986 | Millar .......................... 702/47 |
| 4,763,681 A | 8/1988 | Cuny et al. | |
| 5,047,965 A | 9/1991 | Zlokovitz .................... 700/282 |
| 5,197,328 A | 3/1993 | Fitzgerald .................... 73/168 |
| 5,251,148 A | 10/1993 | Haines et al. ............... 700/282 |
| 5,502,999 A | 4/1996 | Seberger et al. .............. 73/1.59 |
| 5,636,653 A | 6/1997 | Titus ............................ 137/14 |
| 5,684,451 A | 11/1997 | Seberger et al. ......... 340/310 G |
| 5,687,098 A | 11/1997 | Grumstrup et al. .......... 700/282 |
| 5,728,942 A | 3/1998 | Boger .......................... 73/756 |
| 6,035,878 A | 3/2000 | Adams et al. ................... 137/1 |
| 6,055,831 A | 5/2000 | Barbe ......................... 68/12.18 |
| 6,056,008 A | 5/2000 | Adams et al. ............ 137/487.5 |
| 6,158,208 A | * 12/2000 | Hommema ............... 60/39.281 |
| 6,178,997 B1 | 1/2001 | Adams et al. ............ 137/487.5 |

FOREIGN PATENT DOCUMENTS

| | | |
|---|---|---|
| DE | 40 25 323 A1 | 2/1992 |
| DE | 94 04 829.0 U1 | 6/1994 |
| EP | 0335040 A2 | 4/1989 |
| EP | 0 708 389 A1 | 10/1994 |
| EP | 0 660 017 A1 | 6/1995 |
| EP | 1126348 A2 | 8/2001 |

OTHER PUBLICATIONS

International Search Report for International Patent Application No. PCT/US02/40879, dated Apr. 29, 2003, 7 pages.

* cited by examiner

*Primary Examiner*—John Barlow
*Assistant Examiner*—John Le
(74) *Attorney, Agent, or Firm*—Marshall, Gerstein & Borun LLP (57) ABSTRACT

A flow measurement module is adapted to operate in conjunction with a control valve assembly to measure a flow rate of a fluid though a flow passage regulated by the control valve assembly. The flow measurement module is communicatively coupled to an intelligent positioner within the control valve assembly to receive data pertaining to the position of the throttling element within the flow passage. The position of the throttling element is used to identify at least one associated valve sizing coefficient. The flow measurement module determines the flow rate of the fluid through the flow passage based on a sensed upstream pressure, a sensed downstream pressure and the valve sizing coefficient associated with the position of the throttling element within the flow passage.

43 Claims, 4 Drawing Sheets

FLOW MEASUREMENT MODULE AND METHOD

FIELD OF THE INVENTION

The present invention generally relates to accessories for control valve assemblies and, more particularly, to a flow measurement module and method for measuring the flow rate of a fluid through a flow passage regulated by a control valve assembly.

BACKGROUND OF THE INVENTION

In the process control industries, such as for example, chemical processes, refineries, food and beverage industries, control valve assemblies are routinely employed to control the flow characteristics of fluids, such as for example, gas, steam, water, chemical compounds, etc. within a process. Process control systems typically monitor process control parameters and coordinate the operation of process control devices, such as control valve assemblies, in an attempt to ensure efficient operation of process control systems. It is often desirable to monitor the flow rate of fluids through pipelines regulated by control valves assemblies. In addition, changes in operating conditions or process operations may require the monitoring of flow rates of fluids in pipelines that previously did not require monitoring.

A typical control valve assembly generally includes a valve assembly, an actuator and a positioner, such as for example, an intelligent positioner, a pneumatic positioner, or an analog electronic positioner. The valve assembly is typically defined by an inlet and an outlet with a flow passage extending between the inlet and the outlet. A throttling element is typically disposed in the flow passage to control the flow rate of the fluid. A valve stem or a valve shaft typically connects the throttling element to an actuator. The actuator generally moves the throttling element incrementally into and incrementally out of the flow passage thereby controlling the flow rate of a fluid flowing through the flow passage. In cases where an intelligent positioner is used, the positioner generally receives a position setpoint from a process control system as an input and responsively controls the operation of the actuator to alter the position of the throttling element within the flow passage. Intelligent positioners often include a feedback linkage coupled to the valve stem or the valve shaft to generate a position feedback signal to indicate the position of the throttling element within the flow passage. The position feedback signal is generally routed back to the process control system via the intelligent positioner.

A number of different prior art flow measurement devices are available for measuring the flow rate of a fluid through a pipeline under the regulation of a valve assembly. Examples of such prior art flow measurement devices include vortex meters, magnetic flow meters, coriolis meters and differential pressure transmitters and orifice plates. However, process control operations are often required to be shut down during the installation of such prior art flow measurement devices into operational process control systems. Halting process control operations often leads to monetary losses associated with reduced product output. In addition, the procedures associated with the installation of such prior art flow meters are often complex, time consuming, and expensive since they typically require the cutting of pipelines and the installation of weld flanges to connect the flow meters within the pipelines.

Another prior art flow measurement device generally consists of an intelligent positioner having flow measurement capability. Typically such a prior art intelligent positioner includes a database or table or equation which correlates throttling element position to a valve sizing coefficient associated with the valve assembly being used. The prior art intelligent positioner uses the position feedback signal, representative of the position of the throttling element, to determine associated valve sizing coefficients. A flow rate is derived based on the determined valve sizing coefficients, the pressures upstream and downstream of the throttling element and other fluid characteristics. However, the installation of an intelligent positioner having flow measurement capabilities into an existing process control system can be a time consuming and relatively expensive procedure. Such an installation process would generally necessitate the shutting down of process control operations, often resulting in the loss of valuable production time. It is also likely that the cost of an intelligent positioner having flow measurement capabilities would be as expensive, if not more expensive, than the operating positioner. In addition, the existing positioner or the entire control valve assembly is often removed in its entirety prior to the installation of the prior art intelligent positioner having flow measurement capabilities, resulting in the waste of a functional process control device.

Thus what is required is a cost effective flow measurement device that can be installed into an existing process control system with relative ease to operate in conjunction with existing process control devices while minimizing or eliminating disruptions in process control operations during the installation process and minimizing the unnecessary disposal of functional process control devices.

SUMMARY OF THE INVENTION

In accordance with an aspect of the invention, a flow measurement module is adapted to operate in conjunction with a control valve assembly to measure a flow rate of a fluid though a flow passage regulated by the control valve assembly. The control valve assembly generally includes a valve assembly including a throttling element moveable within the flow passage and an intelligent positioner adapted to sense the approximate position of the throttling element within the flow passage and responsively generate a representative position feedback signal. The flow measurement module includes a first communication port adapted to receive an upstream pressure signal representative of a sensed pressure upstream of the throttling element, a second communication port adapted to receive a downstream pressure signal representative of a sensed pressure downstream of the throttling element and a third communication port adapted to receive the position feedback signal representative of the approximate position of the throttling element within the flow passage. A controller is communicatively coupled to the first, second and third communication ports and is adapted to operate in accordance with a computer program embodied on a computer readable medium. The computer program includes a first routine that directs the controller to determine a valve sizing coefficient based on the received position feedback signal and a second routine that directs the controller to issue a flow rate signal representative of the flow rate of the fluid flowing through the flow passage based on the determined valve sizing coefficient, the received upstream pressure signal and the received downstream pressure signal.

In accordance with another aspect of the invention, a method is provided for measuring a flow rate of a fluid though a flow passage regulated by a control valve assembly. The control valve assembly generally includes a valve assembly including a throttling element moveable within the flow passage and an intelligent positioner adapted to sense the approximate position of the throttling element within the flow passage and responsively generate a representative position feedback signal. The method includes the steps of providing a flow measurement module including a controller communicatively coupled to a memory and to first, second and third communication ports. The flow measurement module is communicatively coupled to the intelligent positioner via the first communication port and receives the position feedback signal representative of the approximate position of the throttling element within the flow passage via the first communication port. The flow measurement module receives an upstream pressure signal representative of the sensed pressure upstream of the throttling element via the second communication port and a downstream pressure signal representative of the sensed pressure downstream of the throttling element via the third communication port. A valve sizing coefficient is determined based on the approximate position of the throttling element as indicated by the received position feedback signal. The flow rate of the fluid flowing through the flow passage is determined based on the sensed upstream pressure, the sensed downstream pressure and the determined valve sizing coefficient.

In accordance with yet another aspect of the invention, a method is provided for measuring the flow rate of a fluid flowing through a flow passage within a control valve assembly. The method includes the steps of providing a control valve assembly including a throttling element moveable within the flow passage and Em intelligent positioner adapted to sense a position of the throttling element within the flow passage and providing a flow measurement module. The flow measurement module is communicatively coupled to the intelligent positioner without disrupting the flow of fluid through the flow passage. A flow rate signal representative of the flow rate of the fluid flowing through the flow passage is generated based on sensed pressures upstream and downstream of the throttling element and based on the sensed position of the throttling element within the fluid flow passage.

BRIEF DESCRIPTION OF THE DRAWINGS

The features of this invention which are believed to be novel are set forth with particularity in the appended claims. The invention may be best understood by reference to the following description taken in conjunction with the accompanying drawings, in which like reference numerals identify like elements in the several figures, and in which:

DETAILED DESCRIPTION OF THE PREFERRED EMBODIMENTS

Figure 1:
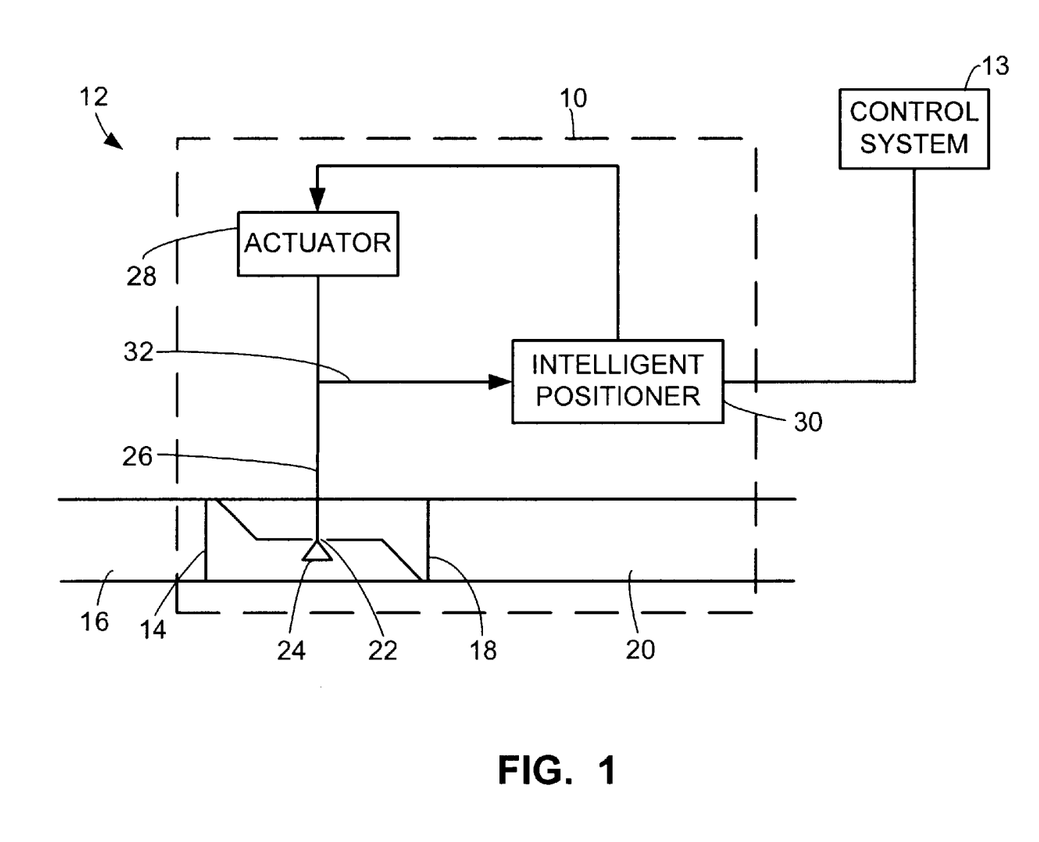
FIG. 1 is a schematic diagram of an example of a control valve assembly within a segment of a process control system that may be adapted to operate in accordance with an embodiment of the present invention.

FIG. 1 illustrates an example of a control valve assembly 10 within a segment of a process control system 12 that may be adapted to operate in accordance with an embodiment of the present invention. The control valve assembly 10 generally controls the flow of a fluid, such as for example a liquid or a gas, through a pipeline in accordance with commands received from a control system 13.

The control valve assembly 10 generally includes a valve assembly with an inlet 14 for connection to an upstream pipeline 16 and an outlet 18 for connection to a downstream pipeline 20 with a flow passage defined between the inlet 14 and the outlet 18. An orifice 22 establishes fluid communication between the inlet 14 and the outlet 18. A throttling element 24, such as for example a valve disk or a valve plug, is generally attached to the bottom of a valve stem or a valve shaft 26 and is often disposed below the orifice 22. The throttling element 24 is generally sized to completely block the orifice 22, such that as the throttling element 24 is moved in an upward direction from its lowest position, the flow of fluid through the flow passage is gradually reduced and eventually eliminated as the throttling element 24 operates to close the orifice 22. On the other hand, as the throttling element 24 is gradually lowered from its uppermost position, the unblocked or open area of the orifice 2 is gradually increased thereby increasing the flow of fluid through the flow passage. As a result, the open area of the orifice 22 is directly related to the position of the throttling element 24 within the flow passage which in turn is related to the flow rate of the fluid flowing through the pipeline. An actuator 28 is operably coupled to the other end of the valve stem or valve shaft 26 and typically supplies the force necessary to raise or lower the position of the throttling element 24. It should be noted that while a particular configuration of a valve assembly with a particular throttling element has been described, the use of alternative configurations of control valves and alternative types of throttling elements are also considered to be within the scope of the invention.

The control valve assembly 10 also includes an intelligent positioner 30 that is communicatively coupled to both the control system 13 and the actuator 28. The control system 13 typically monitors process operations and issues position setpoints to the control valve assembly 10 to appropriately position the throttling element 24 in attempt to ensure proper process operations. The position setpoint signal is typically received and processed by the intelligent positioner 30. Responsive to the position setpoint signal, the intelligent positioner 30 issues positioning signals to the actuator 28 which operate to appropriately position the throttling element 24. A feedback linkage 32 generally couples the valve stem or valve shaft 26 to the intelligent positioner 30 such that the intelligent positioner 30 can track the actual position of the throttling element 24 within the flow passage. Based on the sensed position of the throttling element 24, the intelligent positioner 30 responsively generates a position feedback signal. The position feedback signal may be forwarded to the control system 13 upon request.

Figure 2:
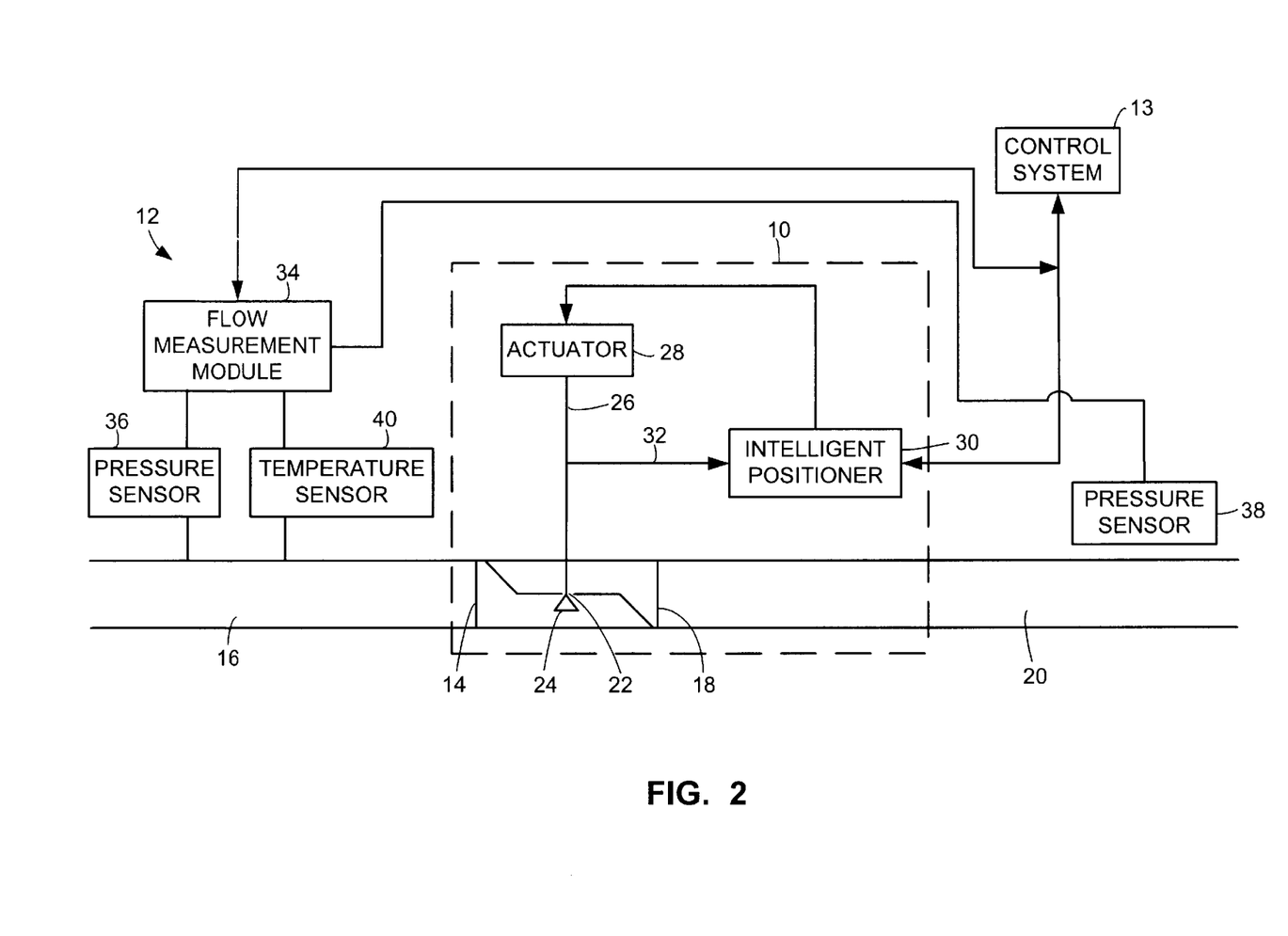
FIG. 2 is a schematic diagram of a flow measurement module operating in conjunction with the control valve assembly within the segment of the process control system in accordance with an embodiment of the present invention.

Referring to FIG. 2 a schematic diagram of a flow measurement module 34 operating in conjunction with the control valve assembly 10 within a segment of the process control system 12 in accordance with an embodiment of the present invention is shown. In one embodiment, pressure sensors 36, 38 are provided upstream and downstream of the inlet 14 or of the throttling element 24. The pressure sensor 36 senses the pressure upstream of the throttling element 24 and responsively generates an upstream pressure signal P1. Similarly, the pressure sensor 38 senses the pressure downstream of the outlet 18 or the throttling element 24 and responsively generates a downstream pressure signal P2. In addition, a temperature sensor 40 is provided upstream of the inlet 14 or throttling element 24 to sense the temperature of the flowing fluid and responsively generates a temperature signal T. It should be noted that while temperature measurements of the fluid are often taken upstream of the throttling element 24, temperature measurements of the fluid taken downstream of the throttling element 24 may also be used.

The flow measurement module 34 is communicatively coupled to the pressure sensors 36, 38, the temperature sensor 40 and to a data line communicatively coupling the control system 13 to the intelligent positioner 30. This permits the flow measurement module 34 to request the position feedback signal representative of the sensed position of the throttling element 24 within the flow passage from the intelligent positioner 30 via the communication link to the data line. In another embodiment, the flow measurement module 34 is directly communicatively coupled to the intelligent positioner 30.

The intelligent positioner 30 is often loop powered on the same line used to communicatively couple the intelligent positioner 30 to the control system 13. In cases where the flow measurement module 34 is directly coupled to the line coupling the intelligent positioner 30 to the control system 13, the flow measurement module 34 can also be loop powered by the control system 13. An alternate embodiment of the flow measurement module 34 may be powered by a independent power source, such as for example by a direct current power supply or a solar cell or a battery unit.

In addition, the flow measurement module 34 may also be directly communicatively coupled to the control system 13 such that once the flow measurement module 34 has determined the flow rate of the fluid flowing through the pipeline, the flow rate can be communicated to the control system 13, if desired. In an alternate embodiment, communications from the flow measurement module 34 directed to the control system 13 may be routed to the control system 13 via the intelligent positioner 30, thereby eliminating the need to create a direct communication link between the flow measurement module 34 and the control system 13. The control system 13 may route the flow rate data to other devices within the process control system, such as for example a pump or another controller. Such a device may use the flow rate data to adjust its own operating parameters in attempt to ensure proper process control operations. In another embodiment, the flow rate may be stored locally in a memory within the flow measurement module 34. Such stored flow rate data may be retrieved directly from the flow measurement module 34 via a local data retrieval device such as for example, a personal digital assistant (PDA), a laptop or other portable data retrieval device. In yet another embodiment, the flow measurement module 34 may include a display unit that displays the determined flow rate of the fluid flowing through the pipeline. In another embodiment, the flow measure module 34 may be communicatively coupled to another device, such as for example a pump or another controller, within the process control system 12 or a device monitoring system. This would permit the flow measurement module 34 to communicate flow rate data to such devices.

In another embodiment, the flow measurement module 34 may include the pressure sensors 36, 38 and temperature sensor 40 as components. In the event that an operational control system, including a valve assembly, is not already configured to be monitored with respect to upstream and downstream pressures and fluid temperature at the time of flow measurement module 34 installation, the pressure sensors 36, 38 and temperature sensor 40 can be installed without the need to interrupt process operations.

Figure 3:
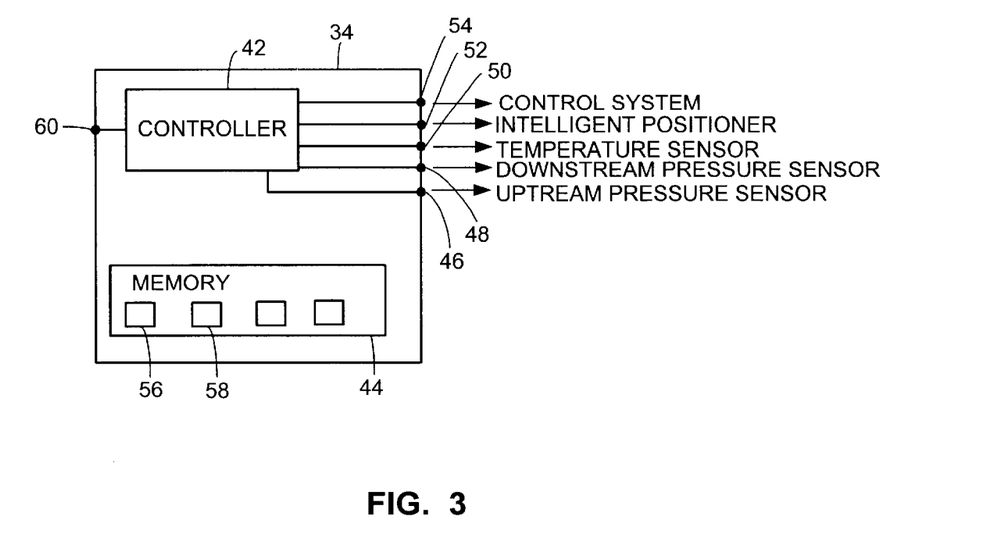
FIG. 3 is a block diagram representation of a flow measurement module in accordance with an embodiment of the present invention.

Referring to FIG. 3, a block diagram representation of a flow measurement module 34 in accordance with an embodiment of the present invention, is shown. The flow measurement module 34 generally includes a controller 42, such as for example a processor, communicatively coupled to a memory 44 and to a plurality of communication ports 46–54. The memory 44 includes a number of software modules including an operating software module 56, a data module 58 for storing a plurality of different throttling element positions, a plurality of valve sizing coefficients and associations between each stored throttling element position and one or more valve coefficients. In another embodiment, a software module including software operations based on an equation representative of the relationship between the different throttling element positions and valve sizing coefficients may be used to determine the valve sizing coefficient associated with a sensed throttling element position. The specific gravity of the fluid flowing through the control valve assembly 10 may also be stored in the data module 58. In addition, in those cases where the temperature of the fluid flowing through the flow passage is relatively constant, the value of the relatively constant temperature may be stored as well, thereby eliminating the need for a temperature sensor.

The communication ports 46, 48, 50, 52, 54 are communicatively coupled to the pressure sensors 36, 38, the temperature sensor 40, the intelligent positioner 30 and the control system 13, respectively. Although individual communication ports are described as dedicated for communications with specific devices, alternative communication configurations including the sharing of communication ports by multiple devices in communication with the flow measurement module 34 are also considered to be within the scope of the invention. In addition, alternative memory configurations for storing operating software and the different types of data are also considered to be within the scope of the invention.

An interface port 60 is communicatively coupled to the controller 42. The interface port 60 may be used to perform a software download of the valve sizing coefficients, throttling element positions, flow coefficient equations, specific gravity data and/or relatively constant fluid temperature values into the data module 58. In an alternative embodiment, the software download may be performed by the control system 13 via the communication port 54. In another embodiment, the necessary data may be entered into the flow measurement module 34 manually by a user via a local or remote user interface. In yet another embodiment, different sets of valve sizing coefficients or flow coefficient equations associated with the different throttling element positions for a number of different control valve assemblies may be pre-stored in the memory 44. The user can then select the appropriate set of pre-stored valve sizing coefficients or flow coefficient equation for use with the type of control valve assembly being used. Similarly, the specific gravities for a number of different types of fluids may also be pre-stored in the memory 44. The user is then provided with the option of entering the type of fluid flowing through the control valve assembly and the appropriate specific gravity is automatically selected for use by the flow measurement module 34.

Figure 4:
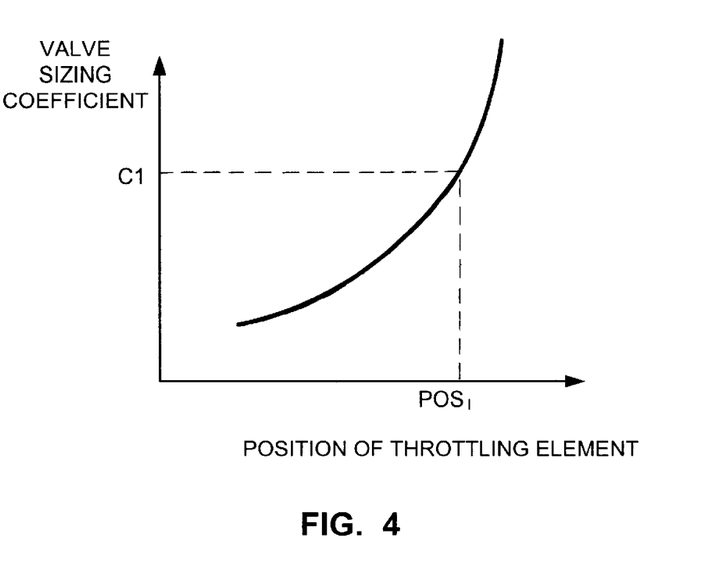
FIG. 4 is a graph illustrating an example of a relationship between different throttling element positions and valve sizing coefficients for a specific valve control assembly.

The flow measurement module 34 generally accepts the upstream pressure signal $P_1$, the downstream pressure signal $P_2$, the temperature signal T and the position feedback signal from the intelligent postioner 30 as inputs and responsively generates a flow rate signal representative of the flow rate of the fluid flowing through the control valve assembly 10 as an output. The flow rate signal is typically forwarded to the control system 13. As is well known in the art, valve sizing coefficients are typically determined experimentally for each style and size of control valve. The relationship between the position of the throttling element within the flow passage to a valve sizing coefficient can generally be represented by a curve. An example of such a curve is shown in FIG. 4. For example, when the throttling element is at a position $POS_1$, the associated valve sizing coefficient is $C_1$. The flow measurement module 34 stores the valve sizing coefficients associated with a plurality of different throttling element positions for the style and size of the particular control valve being used within its memory 44. Such data may be stored in a tabular format. Depending on application specific requirements, the number of throttling element position to valve sizing coefficient associations stored or entered into the flow measurement module 34 may vary. The specific gravity of the fluid flowing through the control valve assembly 10 and the fluid temperature, in cases where the fluid temperature is relatively constant, can also be entered and stored in memory 44. In an alternative embodiment, an equation representative of the relationship between throttling element positions and the valve sizing coefficients can be derived. A software module can be programmed to perform the operations associated with such a derived equation. In other words, the software module would accept a throttling element position as an input and determine an associated valve sizing coefficient using the derived equation.

As mentioned previously, the position feedback signal is representative of the sensed throttling element position within the flow passage. The flow measurement module 34 essentially uses the received throttling element position data to determine the associated valve sizing coefficient(s). In cases where the fluid flowing through the control valve assembly 10 is a liquid, a liquid valve sizing coefficient, $C_v$, associated with the sensed throttling element position is typically determined.

When the fluid flowing through the control valve assembly 10 is a gas, two types of valve sizing coefficients are often required to determine the flow rate of the gas through the flow passage, a gas valve sizing coefficient $C_g$ and a valve recovery coefficient $C_1$. In cases where the valve recovery coefficient $C_1$ associated with a valve assembly is relatively constant over a wide range of throttling element positions, the relatively constant valve recovery coefficient value $C_1$ is typically stored in memory and the flow measurement module 34 determines a gas valve sizing coefficient, $C_g$ associated with the sensed throttling element position.

In cases where the valve recovery coefficient $C_1$ varies with the throttling element position, values of valve recovery coefficients $C_1$ associated with different throttling element positions may be stored in memory. In another embodiment, a software module, programmed to perform operations associated with an equation representative of the relationship between different throttling element positions and valve recovery coefficients $C_1$, may be used to derive the valve recovery coefficient $C_1$ associated with the sensed throttling element position. In any event, upon receiving a sensed throttling element position, the flow measurement module 34 determines an associated gas valve sizing coefficient $C_g$ and an associated valve recovery coefficient $C_1$.

It should be noted that, for a particular fluid, the valve recovery coefficient $C_1$ is typically determined by dividing the gas valve sizing coefficient $C^g$ by the liquid valve sizing coefficient $C_v$. Therefore, in an alternate embodiment, both the liquid valve sizing coefficients $C_v$ and the gas valve sizing coefficients $C_g$ can be entered for the gas flowing through a particular control valve assembly 10. The flow measurement module 34 can determine the valve recovery coefficient $C_1$ for a particular throttling element position by dividing the associated gas valve sizing coefficient $C_g$ by the associated liquid valve sizing coefficient $C_v$. In another embodiment, a software module can be programmed in accordance with equations representative of the relationship between the throttling element position and the liquid valve sizing coefficient $C_v$ and between the throttling element position and the gas valve sizing coefficient $C_g$. The flow measurement module could then use the programmed software module to determine the liquid valve sizing coefficient $C_v$ and the gas valve sizing coefficient $C_g$ associated with a sensed throttling element position.

Figure 5:
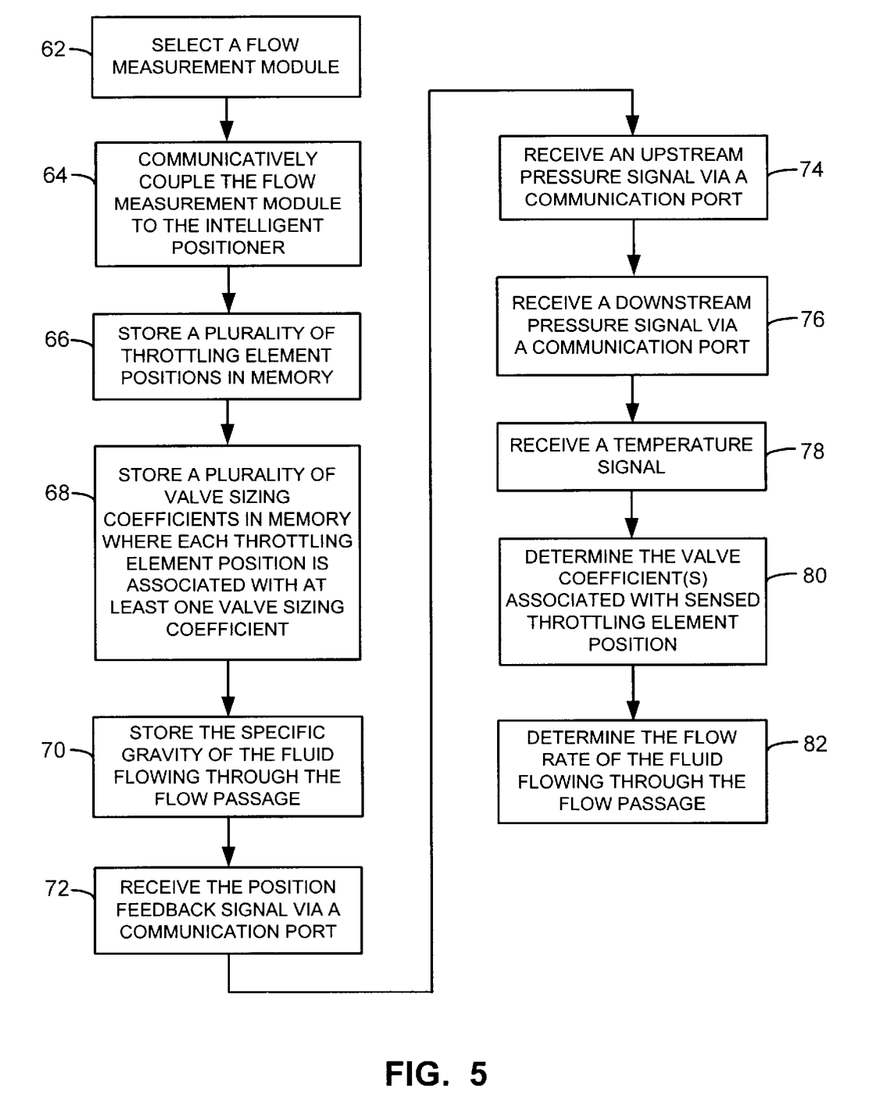
FIG. 5 is a flowchart illustrating a method of measuring a flow rate of a fluid flowing through a flow passage in accordance with an embodiment of the present invention.

Referring to FIG. 5, a method of measuring the flow rate of a fluid though a pipeline regulated by a control valve assembly 10 using the flow measurement module 34 is described. A flow measurement module 34 is selected at step 62 and communicatively coupled to the intelligent positioner 30 via communication port 52 at step 64. The communication link between the intelligent positioner 30 and the flow measurement module 34 can be established during normal process operations. In addition, communications between the flow measurement module 34 and the control system 13 can be routed via the intelligent positioner 30. In an alternate embodiment, a direct communication link is created between the flow measurement module 34 and the control system 13.

A plurality of throttling element positions are entered and stored within the memory 44 of the flow measurement module 34 at step 66. The number of throttling element positions entered for storage depend on the level of flow measurement accuracy required and can vary from application to application. At step 68, a plurality of valve sizing coefficients, are entered and stored in the memory 44 such that each throttling element position is associated with at least one valve sizing coefficient. For example, in cases where the fluid being measured is a liquid, a liquid valve sizing coefficient is entered for every throttling element position. In cases where the fluid being measured is a gas and the valve recovery coefficient C, is relatively constant, the value of the relatively constant valve recovery coefficient $C_1$ and values for gas valve sizing coefficients $C_g$ associated with each throttling element position are entered. In cases where the valve recovery coefficient $C_1$ varies with the throttling element position, a value for valve recovery coefficient $C_1$ and for a gas valve sizing coefficient $C_g$ are entered for each throttling position. In yet another embodiment, values for gas valve sizing coefficients $C_g$ and liquid valve sizing coefficients $C_v$ associated with the throttling element positions for a particular type of valve assembly are entered and the value of the valve recovery coefficient $C_1$ associated with a sensed throttling element position derived.

In one embodiment, the valve sizing coefficients associated with each of the throttling element positions are entered into the flow measurement module memory 44 via a software download. The software download may be performed via the interface port 60 or may be performed by the control system 13 via communication port 54. The throttling element positions may also be entered into the flow measurement module memory 44 via a software download. In another embodiment, the throttling element positions and associated the valve sizing coefficient(s) may be entered individually by a user via a local or remote user interface communicatively coupled to the flow measurement module 34 via the interface port 60.

In yet another embodiment, different sets of valve sizing coefficients associated with a plurality of throttling element positions may be pre-stored within the flow measurement module 44 for different styles and sizes of control valve assemblies. In this embodiment, the user is provided with the option of entering the style and size of the control valve assembly desired and the flow measurement module 34 automatically selects the correct set of valve sizing coefficients.

In an alternate embodiment, equations representative of the relationships between (i) different throttling element positions and liquid valve sizing coefficients $C_v$, (ii) different throttling element positions and gas valve sizing coefficients $C_g$, and/or (iii) different throttling element positions and valve recovery coefficients $C_1$ for a particular type of valve assembly may be derived. Depending on the fluid characteristics and flow characteristics of a particular flow measurement application, the required equations are programmed into software modules in the flow measurement module 34. Thus, the flow measurement module 34 is provided with the capability to determine required valve sizing coefficients based on sensed throttling element positions.

The specific gravity of the fluid to be measured is also entered into the flow measurement module 34 at step 70. In an alternative embodiment, the specific gravities of a number of different fluids may be pre-stored within the flow measurement module 34 so that the user merely has to select the appropriate fluid and the flow measurement module 34 automatically selects the appropriate specific gravity.

The flow measurement module 34 requests and receives the position feedback signal representative of the approximate position of the throttling element 24 within the flow passage from the intelligent positioner 30 via the communication port 52 at step 72. At step 74, the upstream pressure signal $P_1$, representative of the sensed pressure upstream of the throttling element 24 is received by the flow measurement module 34 via the communication port 46. At step 76, the downstream pressure signal $P_2$, representative of the sensed pressure downstream of the throttling element 24 is received via communication port 48. The temperature signal T, representative of the temperature of the fluid flowing through the control valve assembly 10, is received by the flow measurement module 34 via communication port 50, at step 78. In cases where the temperature of the fluid flowing through the flow passage is relatively constant, the value of the relatively constant fluid temperature value can be stored in memory and retrieved as necessary for particular flow measurement applications.

At step 80, based on the throttling element position data received via the position feedback signal, the controller 42 determines the appropriate valve sizing coefficient(s). For example, where the fluid being measured is a liquid, the liquid valve sizing coefficient $C_v$ associated with the throttling element position is retrieved. In cases where the fluid being measured is a gas, depending on the characteristics of the flow measurement application, one or more of the liquid valve sizing coefficient $C_v$, the gas valve sizing coefficient $C_g$ and/or the valve recovery coefficient $C_1$ associated with the sensed throttling element position are determined.

At step 82, the flow measurement module determines the flow rate of the fluid flowing through the pipeline based upon the sensed upstream pressure $P_1$, the sensed downstream pressure $P_2$, the fluid temperature T and the determined valve sizing coefficient(s). It should be noted that the fluid temperature T is only necessary to determine flow rate if the fluid being measured is a gas. More specifically, if the fluid being measured is a liquid, the flow measurement module 34 calculates the flow rate Q in accordance with the liquid sizing equation as indicated below.

$$Q = C_v \sqrt{(P_1 - P_2)/G}$$

where

Q is the flow rate of the liquid, $C_v$ is the liquid valve sizing coefficient associated with the sensed position of the throttling element, $P_1$ is the sensed upstream pressure, $P_2$ is the sensed downstream pressure, and G is the specific gravity of the liquid.

If the fluid being measured is a gas, the flow measurement module 34 calculates the flow rate Q in accordance with the gas sizing equation as indicated below.

$$Q = \sqrt{\frac{520}{GT}} \, C_g P_1 \mathrm{SIN}\left[\left(\frac{3417}{C_1}\right)\sqrt{\frac{P_1 - P_2}{P_1}}\right] \text{Degrees}$$

where

Q is the flow rate of the gas, $C_g$ is the gas valve sizing coefficient associated with the sensed position of the throttling element, $C_1$ is the valve recovery coefficient associated with the sensed position of the throttling element, G is a the specific gravity of the gas, T is the fluid temperature, $P_1$ is the sensed upstream pressure, and $P_2$ is the sensed downstream pressure.

Once the flow measurement module 34 has determined the flow rate of the fluid flowing through the flow passage within the control valve assembly 10, the flow measurement module 34 a flow rate signal representative of the determined flow rate. The flow rate signal may be forwarded to the control system 13 if desired.

In an alternative embodiment, a flow measurement module may be adapted to operate in conjunction with a control valve assembly including an analog positioner. The control system often monitors process operations and issues position setpoints to the control valve assembly to appropriately position a throttling element within a flow passage to control the flow rate of a fluid through a pipeline. The flow measurement module is communicatively coupled to the control system to also receive the position setpoint data issued by the control system. The flow measurement module uses the received position setpoint data to determine an approximate position of the throttling element within the flow passage. The approximate position of the throttling element is then used to determine associated valve sizing coefficients and derive flow rate in the manner described previously.

It should be noted that while methods of determining flow rates in accordance with a liquid sizing equation and a gas sizing equation have been described, the use of alternative forms of sizing equations, such as those for steam, those derived by different companies, those derived based on different industry standards, that will be apparent to one skilled in the art, are also considered to be within the scope of the invention. In addition, flow measurement modules adapted to operate with valve sizing coefficients requiring corrections based on factors, such as for example viscosity, flashing and cavitation, etc., are also considered to be within the scope of the invention.

Still other modifications and alternative embodiments of the invention will be apparent to those skilled in the art in view of the foregoing description. The description is to be construed as illustrative only, and is for the purpose of teaching those skilled in the art the best mode of carrying out the invention. The details of the structure and method may be varied substantially without departing from the spirit of the invention, and exclusive use of all modifications which come within the scope of the appended claims is reserved.

What is claimed is:

1. A flow measurement module adapted to operate in conjunction with an existing control valve assembly having an associated control system the control valve assembly including a valve assembly including a throttling element moveable within the flow passage and an intelligent positioner adapted to sense the approximate position of the throttling element within the flow passage and responsively generate a representative position feedback signal, the control system being communicatively coupled to the intelligent positioner to deliver a position setpoint signal to the intelligent positioner and receive the position feedback signal from the intelligent positioner, the flow measurement module comprising:

a first communication port adapted to receive an upstream pressure signal representative of a sensed pressure upstream of the throttling element;

a second communication port adapted to receive a downstream pressure signal representative of a sensed pressure downstream of the throttling element;

a third communication port adapted to receive the position feedback signal representative of the approximate position of the throttling element within the flow passage without disrupting the flow of fluid through the flow passage; and a controller communicatively coupled to the first, second and third communication ports, the controller being adapted to operate in accordance with a computer program embodied on a computer readable medium, the computer program comprising:

a first routine that directs the controller to determine a valve sizing coefficient based on the received position feedback signal; and a second routine that directs the controller to determine the flow rate of the fluid flowing through the flow passage based on the determined valve sizing coefficient, the received upstream pressure signal and the received downstream pressure signal.

2. The flow measurement module of claim 1, further including a memory communicatively coupled to the controller, the memory being adapted to store a plurality of different throttling element positions and a plurality of valve sizing coefficients where each stored throttling element position is associated with at least one valve sizing coefficient.

3. The flow measurement module of claim 2, wherein the memory is adapted to receive the plurality of valve sizing coefficients associated with each of a plurality of the throttling element positions via a software download.

4. The flow measurement module of claim 2, wherein the memory is adapted to receive the plurality of valve sizing coefficients associated with each of the plurality of throttling element positions as entered individually by a user via a user interface.

5. The flow measurement module of claim 2, wherein the memory is adapted to store a first set of selectable valve sizing coefficients for use with a first control valve and a second set of selectable valve sizing coefficients for use with a second control valve.

6. The flow measurement module of claim 2, wherein the first routine directs the controller to retrieve from memory the valve sizing coefficient associated with the approximate position of the throttling element as indicated by the position feedback signal.

7. The flow measurement module of claim 1, wherein the first routine directs the controller to determine the valve sizing coefficient associated with the approximate position of the throttling element in accordance with an equation representative of a relationship between a position of the throttling element and an associated valve sizing coefficient.

8. The flow measurement nodule of claim 1, further including a first pressure sensor adapted to sense the pressure upstream of the throttling element and responsively generate the upstream pressure signal.

9. The flow measurement module of claim 1, further including a second pressure sensor adapted to sense the pressure downstream of the throttling element and responsively generate the downstream pressure signal.

10. The flow measurement module of claim 1, wherein the third communication port is adapted to be communicatively coupled to the intelligent positioner to receive the position feedback signal.

11. The flow measurement module of claim 1, wherein the third communication port is adapted to be communicatively coupled to the control system to receive the position feedback signal.

12. The flow measurement module of claim 1, further including a memory, the memory being adapted to store a specific gravity of the fluid flowing through the flow passage.

13. The flow measurement module of claim 1, wherein the first routine directs the controller to determine a liquid valve sizing coefficient based on the received position feedback signal.

14. The flow measurement module of claim 13, wherein the second routine directs the controller to issue a flow rate signal representative of the flow rate Q of a liquid fluid flowing through the flow passage in accordance with $$Q = C_v \sqrt{(P1-P2)/G}$$

where

Q is the flow rate of the liquid, $C_v$ is the liquid valve sizing coefficient associated with the approximate position of the throttling element, P1 is the sensed upstream pressure, P2 is the sensed downstream pressure, and G is a specific gravity of the liquid fluid.

15. The flow measurement module of claim 1, further comprising a fourth communication port adapted to receive a temperature signal representative of a sensed temperature of the fluid flowing through the flow passage.

16. The flow measurement module of claim 15, further including a temperature sensor adapted to sense the temperature of the fluid upstream of the throttling element and responsively generate the temperature signal.

17. The flow measurement module of claim 1, further including a memory, the memory being adapted to store a fluid temperature.

18. The flow measurement module of claim 1, wherein the first routine directs the controller to determine a gas valve sizing coefficient based on the received position feedback signal.

19. The flow measurement module of claim 18, wherein the first routine directs the controller to determine a liquid valve sizing coefficient based on the received position feedback signal and to generate a valve recovery coefficient based on the determined gas valve sizing coefficient and the determined liquid valve sizing coefficient.

20. The flow measurement module of claim 1, wherein the first routine directs the controller to determine a gas sizing coefficient and a valve recovery coefficient based on the received position feedback signal.

21. The flow measurement module of claim 20, wherein the second routine directs the controller to issue a flow rate signal representative of the flow rate Q of a gas fluid flowing through the flow passage in accordance with:

$$Q = \sqrt{\frac{520}{GT}} \, C_g P_1 \text{SIN}\left[\left(\frac{3417}{C_1}\right)\sqrt{\frac{P_1 - P_2}{P_1}}\right] \text{Degrees}$$

where

Q is the flow rate of the gas,

Cg is the gas valve sizing coefficient associated with the approximate position of the throttling element, C1 is the valve recovery coefficient associated with the approximate position of the throttling element, G is a specific gravity of the gas, T is a temperature of the fluid flowing through the flow passage, P1 is the sensed upstream pressure, and P2 is the sensed downstream pressure.

22. A method of measuring a flow rate of a fluid though a flow passage regulated by an existing control valve assembly having an associated control system, the control valve assembly including a valve assembly including a throttling element moveable within the flow passage and an intelligent positioner adapted to sense the approximate position of the throttling element within the flow passage and responsively generate a representative position feedback signal, the control system being communicatively coupled to the intelligent positioner to deliver a position setpoint signal to the intelligent positioner and receive the position feedback signal from the intelligent positioner, the method comprising the steps of:

providing a flow measurement module including a controller communicatively coupled to a memory and to first, second and third communication ports;

communicatively coupling the flow measurement module to the intelligent positioner via the first communication port without disrupting flow of fluid through the fluid passage;

receiving the position feedback signal representative of the approximate position of the throttling element within the flow passage via the first communication port;

receiving an upstream pressure signal representative of the sensed pressure upstream of the throttling element via the second communication port;

receiving a downstream pressure signal representative of the sensed pressure downstream of the throttling element via the third communication port;

determining a valve sizing coefficient based on the approximate position of the throttling element as indicated by the received position feedback signal; and determining a flow rate of the fluid flowing through the flow passage based on the sensed upstream pressure, the sensed downstream pressure and the determined valve sizing coefficient.

23. The method of claim 22, further comprising the steps of storing a plurality of throttling element positions in a memory communicatively coupled to the controller and storing a plurality of valve sizing coefficients in the memory where each stored throttling element position is associated with at least one valve sizing coefficient.

24. The method of claim 23, wherein the step of determining the valve sizing coefficient further includes the step of retrieving from the memory the valve sizing coefficient associated with the approximate position of the throttling element as indicated by the position feedback signal.

25. The method of claim 23, further comprising the step of receiving the plurality of valve sizing coefficients associated with each of the plurality of throttling element positions via a software download.

26. The method of claim 23, further comprising the step of receiving the plurality of valve sizing coefficients associated with each of the plurality of throttling element positions as entered individually by a user via a user interface.

27. The method of claim 23, further comprising the step of storing a first set of selectable valve sizing coefficients for use with a first control valve and storing a second set of selectable valve sizing coefficients for use with a second control valve.

28. The method of claim 27, further comprising the step of selecting the first stored set of selectable valve sizing coefficients if a first control valve is used to regulate the flow of fluid in the flow passage.

29. The method of claim 22, wherein the step of determining the valve sizing coefficient further includes the step of determining the valve sizing coefficient associated with the approximate position of the throttling element in accordance with an equation representative of the relationship between a position of the throttling element and an associated valve sizing coefficient.

30. The method of claim 22, further including the step of communicatively coupling the flow measurement module to the control system without disrupting the flow of fluid through the flow passage.

31. The method of claim 22, further including the step of storing a specific gravity of a fluid flowing through the flow passage in a memory, the memory being communicatively coupled to the controller.

32. The method of claim 22, wherein the step of determining the valve sizing coefficient further comprises determining the liquid valve sizing coefficient based on the approximate position of the throttling element as indicated by the received position feedback signal.

33. The method of claim 32, wherein the step of determining the flow rate of the fluid through the flow passage further comprises determining the flow rate Q of a liquid fluid in accordance with $$Q = C_v \sqrt{(P_1 - P_2)/G}$$

where

Q is the flow rate of the liquid,

Cv is the liquid valve sizing coefficient associated with the approximate position of the throttling element, P1 is the sensed upstream pressure, P2 is the sensed downstream pressure, and G is a specific gravity of the liquid.

34. The method of claim 22, further comprising the step of receiving a temperature signal representative of a sensed temperature of the fluid flowing through the flow passage via a fourth communication port, the fourth communication port being communicatively coupled to the controller.

35. The method of claim 22, further comprising the step of storing the approximate temperature of the fluid flowing through the flow passage in a memory, the memory being communicatively coupled to the controller.

36. The method of claim 22, wherein the step of determining the valve sizing coefficient further includes determining a gas valve sizing coefficient based on the approximate position of the throttling element as indicated by the received position feedback signal.

37. The method of claim 36, wherein the step of determining the valve sizing coefficient further comprises the steps of:
    determining a liquid valve sizing coefficient based on the approximate position of the throttling element as indicated by the received position feedback signal; and
    generating a valve recovery coefficient based on the determined gas valve sizing coefficient and the determined liquid valve sizing coefficient.

38. The method of claim 22, wherein the step of determining the valve sizing coefficient further includes determining a gas valve sizing coefficient and a valve recovery coefficient based on the approximate position of the throttling element as indicated by the received position feedback signal.

39. The method of claim 38, wherein the step of determining the flow rate of the fluid through the flow passage further comprises determining the flow rate Q of a gas fluid flowing through the flow passage in accordance with $$Q = \sqrt{\frac{520}{GT}}\, C_g P_1 \mathrm{SIN}\left[\left(\frac{3417}{C_1}\right)\sqrt{\frac{P_1 - P_2}{P_1}}\,\right] \mathrm{Degrees}$$

where

Q is the flow rate of the gas,

Cg is the gas valve sizing coefficient associated with the approximate position of the throttling element, C1 is the valve recovery coefficient associated with the approximate position of the throttling element, G is a specific gravity of the gas, T is a temperature of the fluid flowing through the flow passage, P1 is the sensed upstream pressure, and P2 is the sensed downstream pressure.

40. The method of claim 22, further including the step of storing the determined flow rate in a flow measurement module memory.

41. The method of claim 40, further including the step of retrieving the stored flow rate via a local data retrieval device.

42. The method of claim 22, further including the step of displaying the determined flow rate on a flow measurement module display unit.

43. The method of claim 22, further including the steps of communicatively coupling the flow measurement module to a process control system device and communicating the determined flow rate to the process control system device.

* * * * *

UNITED STATES PATENT AND TRADEMARK OFFICE
CERTIFICATE OF CORRECTION

PATENT NO. : 6,725,167 B2
DATED : April 20, 2004
INVENTOR(S) : Bruce F. Grumstrup et al.

It is certified that error appears in the above-identified patent and that said Letters Patent is hereby corrected as shown below:

Drawings,
Figure 3, line 5, please delete "UPTREAM" and insert -- UPSTREAM --.

Column 3,
Line 29, please delete "Em" and insert -- an --.

Column 4,
Line 22, please delete "2" and insert -- 22 --.

Column 7,
Line 67, please delete "C$^g$" and insert -- $C_g$ --.

Column 8,
Line 44, please delete "C," and insert -- $C_1$ --.
Line 46, please delete "Cg" and insert -- $C_g$ --.

Column 10,
Line 9, please delete "Cv" and insert -- $C_v$ --.
Line 33, please delete "G is a the" and insert -- G is the --.
Line 41, please delete "module 34 is a flow rate" and insert -- module 34 generates a flow rate --.

Column 11,
Line 16, please delete "system" and insert -- system, --.

Column 12,
Line 15, please delete "nodule" and insert -- module --.
Line 44, please delete "(P1-P2)" and insert -- $(P_1-P_2)$ --.
Line 50, please delete "P1" and insert -- $P_1$ --.
Line 51, please delete "P2" and insert -- $P_2$ --.

Column 13,
Line 17, please delete "CgP1" and insert -- $C_gP_1$ --.
Line 17, please delete "(P1-P2)" and nsert -- $(P_1-P_2)$ --.
Lines 18 and 25, please delete "C1" and insert -- $C_1$ --.
Lines 18 and 30, please delete "P1" and insert -- $P_1$ --.
Line 23 please delete "Cg" and insert -- $C_g$ --.
Line 31, please delete "P2" and insert -- $P_2$ --.

UNITED STATES PATENT AND TRADEMARK OFFICE
CERTIFICATE OF CORRECTION

PATENT NO. : 6,725,167 B2
DATED : April 20, 2004
INVENTOR(S) : Bruce F. Grumstrup et al.

It is certified that error appears in the above-identified patent and that said Letters Patent is hereby corrected as shown below:

Column 14,
Lines 56 and 60, please delete "Cv" and insert -- $C_v$ --.
Line 56, please delete "(P1-P2)" and insert -- $(P_1-P_2)$ --.
Line 62, please delete "P1" and insert -- $P_1$ --.
Line 63 please delete "P2" and insert -- $P_2$ --.

Column 16,
Line 9, please delete "Cg" and insert -- $C_g$ --.
Line 11, please delete "C1" and insert -- $C_1$ --.
Line 16, please delete "P1" and insert -- $P_1$ --.
Line 17, please delete "P2" and insert -- $P_2$ --.

Signed and Sealed this

Seventeenth Day of August, 2004

JON W. DUDAS
*Acting Director of the United States Patent and Trademark Office*